Patented Oct. 14, 1952

2,614,129

UNITED STATES PATENT OFFICE 2,614,129

PERFLUORINATION

Earl T. McBee, Richard M. Robb, and Waldo B. Ligett, La Fayette, Ind., assignors to Purdue Research Foundation, West Lafayette, Ind., a corporation of Indiana No Drawing. Application August 10, 1943, Serial No. 498,094

13 Claims. (Cl. 260—648)

This invention relates to a fluorination process and more particularly to a method for preparing perfluoro organic compounds and to certain of the compounds so obtained.

Conventional procedures for the production of fluorine-containing organic derivatives have involved the treatment of organic compounds containing chlorine, bromine, or iodine with fluorinating agents such as $HF$, $SbF_3$, $HgF_2$, etc., which under certain conditions tend to displace at least a portion of the established halogen with fluorine. Such methods of operation have not been particularly satisfactory by reason of difficulties in the preparation of many of the chloro, bromo, or iodo compounds necessarily employed as reactants, and the tendency of such fluorinating agents to displace a part only of the established halogen, whereby desired fluoro derivatives, and particularly perfluorocompounds, have not been readily obtainable.

It is recognized that fluorine is dissimilar to chlorine and bromine as regards its use in direct halogenation. This gas tends to react with many organic materials with explosive violence. Most metal fluorides are unsatisfactory for ordinary exchange or double decomposition reaction because, under the conditions necessary to obtain an exchange of halogen, they tend to produce unsaturated breakdown products and do not always give uniform or complete displacement of halogen other than fluorine in organic compounds. Bromine trifluoride, chlorine trifluoride, and iodine pentafluoride, all of which have been employed in the preparation of fluorine derivatives, are frequently explosive on contact with or in mixture with organic materials. Also, these materials have been found to operate as brominating, chlorinating, or iodinating agents on occasion, whereby indeterminate mixtures of halogenated organic compounds are obtained.

A further shortcoming of each of the foregoing materials resides in their comparative inoperativeness in fluorinating hydrocarbons or other halogen-free organic compounds. The required presence of chlorine, bromine, or iodine in the structure of organic reactants employed in most fluorinating operations complicates the problem of the recovery, purification, and analysis of reaction products. Also, most known fluorinating agents are liquids or gases under recommended conditions of operation, necessitating the use of specialized equipment and, by reason of the vigorous nature of the reaction as carried out therewith, meticulous control of operating temperatures and pressures, and the utilization of special safety measures against fire and explosion hazards. The expense and inconvenience of the special features of operation heretofore required have contributed materially to the slowness of development of the art of organic fluoro compounds. The need for new and improved procedures of fluorination is evident.

It is among the objects of the present invention to provide a fluorination method which will not be subject to the disadvantages as set forth above. A further object is to supply a procedure to produce perfluoro organic derivatives by replacing hydrogen by fluorine, which is less hazardous than those previously known. Another object is to supply an improved procedure whereby the use of chlorinated, brominated, and iodinated intermediates will not be essential for the preparation of perfluoro organic compounds. An additional object is to supply an improved method for the preparation of perfluoro organic compounds whereby the decomposition of the organic reactant and of the desired end product is substantially avoided. A further object is to provide a method for the preparation of fluorocarbons. Another object is to supply a such procedure wherein a halohydrocarbon, containing attached directly to carbon at least one atom of hydrogen or of halogen other than fluorine, is employed as a reactant. Another object is to provide novel perfluoro and/or fluorocarbon compounds. Other objects will become apparent from the following specification and claims.

According to the present invention, perfluorination is accomplished and perfluoro compounds are obtained by contacting an organic compound, containing at least one hydrogen atom or halogen atom other than fluorine attached to carbon, with silver difluoride as an active fluorinating agent under such conditions and for such time that all of such other halogen or hydrogen in the compound is replaced by fluorine. This may be described as exhaustive fluorination. Silver difluoride is a solid compound conveniently prepared by treating silver monofluoride with fluorine at temperatures between 200° and 300° C. This compound is substantially stable at 600° C. The fluorinating action exerted by silver difluoride at reaction temperatures results in the substitution of fluorine for replaceable hydrogen directly attached to carbon, the addition of fluorine to unsaturated carbon linkages, the controllable cleavage of carbon-carbon and carbon-oxygen bonds, and the replacement of halogens other than fluorine present in the compound. Silver monofluoride and generally hydrogen fluoride are by-products of reactions in which silver difluoride is employed as the active halogenating agent. The silver difluoride may be regenerated from the by-product monofluoride by contacting the latter with gaseous fluorine at temperatures desirably above 200° C., and preferably without removing the silver fluoride from the fluorination reactor.

Silver difluoride has been found to be a powerful fluorinating agent for organic compounds generally. Processes embodying the use of silver difluoride as the active halogenating agent avoid many of the objectionable features heretofore inherent to fluorinating operations. Thus there appears to be a minimum of explosion hazard when working with silver difluoride, possibly due to the fact that the fluorination action is accomplished with less heat of reaction than is ordinarily the case when operating with elemental fluorine. However, in spite of the less vigorous action exerted by silver difluoride, perfluorination is obtained in accordance with the procedures herein set forth. It has also been observed that a minimum of decomposition and degradation of reactants accompanies fluorinating operations with silver difluoride provided that a definite relationship be maintained between reaction temperatures and temperatures of decomposition of organic reactant and intermediate products.

The operability of chlorine-, bromine-, and iodine-free organic compounds as reactants avoids the necessity for producing these halo analogues as a preliminary step to obtaining the desired perfluoro compounds. Where a chloro, bromo, or iodo organic compound is employed as a reactant, the new practice provides a way of avoiding the formation of mixed halo derivatives in which a portion only of the chlorine, bromine, or iodine has been displaced by fluorine, in that the silver difluoride is adapted to replace completely such halogen and any remaining hydrogen to give maximum yields of perfluoro compounds. Where a partially fluorinated hydrocarbon, halo hydrocarbon, or other organic compound is employed as a reactant, the presence of fluorine atoms generally increases the stability of the reactant whereby perfluoro compounds are obtained with a minimum of decomposition and disintegration in the fluorinating zone. Such perfluorinating can be accomplished under comparatively mild reaction conditions.

In operating in accordance with the invention, any desired hydrocarbon, halo-hydrocarbon, ether, ester, ketone, alcohol, and the like may be employed, whether aliphatic or aromatic in nature, provided only that such a compound contain at least one hydrogen atom or halogen atom other than fluorine directly attached to carbon. The invention is carried out by contacting such organic compound in any desired phase with solid silver difluoride at a temperature sufficient to accomplish exhaustive fluorination. When operating in the liquid phase, any suitable corrosion resistant apparatus may be employed, whether of pressure type construction or otherwise. By "corrosion resistant" is meant resistant to the action of silver difluoride, of hydrogen fluoride, and other by-products developed during the reaction and/or of fluorine when it may be passed through the reactor for the regeneration of the silver difluoride. If desired, an inert solvent may be employed as a diluent for the organic reactant or as a dispersing medium for the solid silver difluoride. Preferred solvents are liquid fluoro-carbons, anhydrous hydrogen fluoride, etc.

The preferred method of operation resides in contacting the organic compound in gaseous phase with solid silver difluoride. For difficulty volatilizable compounds the liquid phase may be used. The vapor phase operation is conveniently accomplished by passing the vaporized organic reactant over a train of silver difluoride and collecting the perfluoro reaction products. A satisfactory result is obtained when a metal tube or reactor of other type is packed with silver difluoride in finely divided form and the vapors of the selected organic compound are passed therethrough at reaction temperatures. When operating in this fashion, the product of reaction usually is collected outside the reaction zone by condensing the effluent gases.

When operating as described above, the organic compound employed as reactant may simply be vaporized by boiling and the vapors led into the reaction zone. A convenient method of operation and one which aids in maintaining a continuous movement of the organic reactant and product through the silver difluoride includes bubbling a stream of an inert gas, such as nitrogen or helium, through the liquid organic reactant at temperatures approaching the vaporization or boiling temperature of the latter, and passing the mixed gases through the silver difluoride-containing reaction zone. An alternate procedure includes pre-mixing vapors of the reactant with an inert gas in a gasometer or similar equipment. Also the organic reactant in liquid phase may be introduced portionwise into the reaction zone maintained at such a temperature as to cause volatilization. A further procedure includes use of reduced pressure to aid in the vaporization of the organic substance, especially when high boiling substances are used.

Regardless of the exact method employed in obtaining and introducing the reactant, optimum results are obtained and minimum amounts of silver difluoride are required when the latter is employed in finely divided form. Satisfactory yields have been obtained while operating with silver difluoride in an amount in excess of that theoretically required to accomplish perfluorination.

The exact temperature of operation varies with the phase in which the organic reactant is employed and may be from 50° C., or lower, to 450° C., or higher, depending upon the comparative stability of the organic compounds present in the reaction zone, and the length of time the organic reactant is to be contacted with the silver difluoride.

When operating in the gaseous phase, the vapor of the organic reactant is conveniently, although not necessarily, introduced into the reaction zone at an initial temperature at least as high as the boiling temperature of the reactant, at the pressure employed, and the temperature may be increased gradually or step-wise to the temperature required to obtain perfluorination. Under such conditions, a high percentage of the reaction product is swept through the reaction zone and may be recovered, as by condensation. When operating at lower temperatures, there is a tendency for appreciable amounts of fluorine-containing reaction products to be deposited on the silver difluoride, the walls of the reaction chamber, or otherwise to be retained within the reaction zone. When this condition exists, the silver difluoride reactor, series of reactors, or other reaction setup may be blown or swept out by passing a stream of inert gas therethrough at temperatures high enough to cause expulsion of the product.

A preferred mode of operation comprises successively subjecting the organic reactant to the action of silver difluoride under conditions of progressively increasing temperature. It has been found that highly fluorinated organic compounds are very stable. A maximum of stability is obtained with perfluorination. Thus, it is desirable that the initial temperature of reaction be below the decomposition temperature of the organic reactant, and that subsequent temperatures and exposure times to which the intermediate products of reaction are subjected be selected so as to be below the temperature and exposure time at which such intermediate reaction products undergo little, if any, decomposition. For optimum results, a balance must be struck between the maximum temperature to which the reactants and intermediates can be heated without substantial decomposition and that temperature at which fluorination is most readily accomplished.

A convenient mode of procedure includes employing a comparatively low initial temperature and increasing the temperature during the reaction as the organic constituents of the reaction mixture become more stable, with the temperature reaching a maximum at the conclusion of the fluorination reaction. This may be accomplished in several ways. For example, the crude reaction product from the initial fluorination operation may be recycled in contact with silver difluoride and the reaction temperature increased with each recycling operation until the desired degree of fluorination is obtained. An alternate procedure involves confining the silver difluoride and organic reactant within the reaction zone and progressively increasing the temperature as the reaction approaches completion. A further and preferred mode of operation includes passing the reactant through a plurality of fluorination units, e. g., two or more tubes packed with silver difluoride and connected in series, with each successive unit or reaction zone being maintained at a temperature higher than that of the preceding unit. In any event by operating at progressively increasing reaction temperatures, perfluorination may be accomplished with minimum of decomposition. A similar result is obtained when partially fluorinated organic compounds are employed as reactants to form perfluorinated derivatives. In such cases, the presence in the molecule of established fluorine atoms increases the stability of the organic reactant so as to accomplish the desired result without such decomposition as might otherwise be expected under the conditions of reaction. In continuous operation it is desirable to provide means for cooling the reaction chamber in order to take up a portion of the heat generated by the reaction.

In gaseous phase operation, the effluent gases from the reactor are collected and the organic fluoro compounds therein separated by being passed into a water-, ice-, or Dry Ice-cooled condenser, by scrubbing with an inert solvent therefor, e. g. a fluorocarbon, etc., or by absorption on an inert solid. The preferred method of operation comprises condensing the organic constituents of the effluent gases in a suitable vessel, e. g. a copper condenser or container. By employing a series of such condensers cooled succesively with cold water, ice, and Dry Ice, a rough separation of the products of reaction may be obtained.

After the reaction products have been collected, they are conveniently reduced to liquid or solid form, and purified according to methods well known in the art. One mode of operation particularly applicable to water-insoluble and water-stable derivatives comprises successively washing the crude product with dilute aqueous alkali and water and thereafter fractionally distilling or steam-distilling. The product may be condensed, the hydrogen fluoride decanted, and the organic phase distilled or extracted. Since the highest possible degree of fluorination is desired, i. e. perfluorination, it is frequently advantageous to recirculate or recycle the crude fluorination product initially obtained. This may be accomplished by contacting such crude product in either the liquid or vapor state with fresh silver difluoride. A particularly convenient method of operation includes regenerating the silver difluoride originally employed and recontacting the initial product of reaction therewith. Such regeneration is preferably carried out by contacting the spent or partially spent silver difluoride with gaseous fluorine at temperatures between 200° and 300° C. This procedure of regeneration and recycling may be repeated as many times as is necessary to obtain perfluorination. A similar result is obtained by use of a plurality of fluorination units connected in series.

In the foregoing reaction, the time required to accomplish the desired degree of fluorination varies with the temperature employed, the organic reactant selected, the phase of operation, and the state of subdivision of the silver difluoride. A contact period between the organic reactant and the silver difluoride of from a few seconds to several hours may be productive of the desired perfluorination.

The procedures as herein set forth may be carried out at subatmospheric, superatmospheric, or atmospheric pressure. The preferred temperatures of reaction will vary somewhat with the pressure employed.

The preferred embodiment of the present invention concerns operation with organic compounds containing at least two carbon atoms. While single carbon atom compounds such as methane, formaldehyde, methylene chloride, etc., are included within the scope of the broad invention, certain differences with respect to the mode and mechanics of operation as between these compounds and those containing a plurality of carbon atoms have been found to be significant.

An important embodiment of the present invention resides in the preparation of fluorocarbons, the preparation of which, except for carbon tetrafluoride, has been hitherto found most difficult according to known methods of operation. In preparing fluorocarbons the organic reactant may be a hydrocarbon or a partially or completely halogenated hydrocarbon, provided only that such reactant contain at least one hydrogen atom or one halogen atom other than fluorine attached to carbon. Partially fluorinated hydrocarbons are included within this group of reactants and, in certain cases, may constitute a preferred embodiment of the invention.

The present application is a continuation-in-part of our copending application filed June 4, 1943, and concerned with the preparation of fluorinated organic compounds broadly by reacting organic compounds with silver difluoride.

The following examples are purely illustrative and are not to be construed as limiting:

*Example 1*

One hundred fifty milliliters of normal heptane was vaporized and slowly passed into a reactor consisting of an 8-foot length of 1.25-inch copper tubing containing silver difluoride and maintained at 200° C. The crude fluorination product was condensed, washed with dilute aqueous sodium hydroxide until free of hydrogen fluoride, dried, and fractionally distilled to obtain a product with a boiling range of 80° C. to 150° C. The product contained 64.6 per cent by weight of fluorine.

*Example 2*

A "flat type" reactor consisting of a steel chamber 5 feet long, 8 inches wide, and 1 inch deep, electrically heated and equipped with facilities for full temperature control from room temperature to 400° C., was packed with 20 moles of finely divided silver difluoride.

A quantity of partially fluorinated heptane was passed over the silver difluoride at 300° C. to obtain 2 grams of mixed fluorocarbons and 115 grams of perfluoroheptane ($C_7F_{16}$) boiling at 81.3° C.–81.8° C. The inner surfaces of steel reactor were examined and found to be substantially unattacked at the conclusion of the reaction.

*Example 3*

One hundred milliliters of hexadecane was passed into the flat reactor at 125° C. over a period of 3.5 hours. The temperature was maintained at 125° C. for 8 hours and thereafter raised to 200° C. and the reactor was swept out with nitrogen. The temperature of the reactor was then increased to 300° C., and nitrogen again passed therethrough to recover additional product of reaction. The 72 milliliters of product so obtained was recycled through the reactor at 325° C. by being introduced thereinto in 8-milliliter portions over a period of 20 hours. The reactor was then flushed with nitrogen at 325° C. to obtain 65 milliliters of a semi-solid white product. This product consisted of a mixture of fluoro-carbons formed by the fluorination and fluorinolysis of hexadecane. Rectification yielded fractions, the boiling points of which corresponded to the perfluoro derivatives of hexane, heptane, octane, nonane, decane, undecane, dodecane, and tridecane. Lower- and higher-boiling products were formed, but were not isolated. The higher-boiling portion of this product possessed lubricating properties.

*Example 4*

Fifty milliliters of a mixture of diethylbenzenes was passed portion-wise over a period of 2 hours into a 12-foot by 1.25-inch tubular copper reactor at 190° C., containing an excess of finely divided silver difluoride. The reactor and contents were then heated to a 280° C. for 1.5 hours and blown with nitrogen for 4 hours. The 89 grams of mixed product obtained by condensation of the effluent gases was successively recycled through the reactor at 190° C., 300° C., and 360° C. Fractional distillation of the resulting product yielded perfluorodiethylcyclohexane boiling at 142° C. at 751 millimeters pressure. A molecular weight determination gave a value of 505 as compared to a theoretical molecular weight of 500.

*Example 5*

One hundred milliliters (86 grams) of paracymene was introduced portion-wise into a 1.25-inch copper tube 12 feet long, packed with silver difluoride. The temperature of the reactor was maintained at 200° C. for 3 hours after all of the para-cymene had been introduced, and was thereafter maintained at 250° C. for a period of 12 hours. The temperature was then raised to 300° C. and the reactor was swept with nitrogen for 1 hour. The effluent gases from the reactor were collected and condensed throughout the period of operation. The resulting crude product was successively washed with dilute sodium hydroxide and water, and thereafter steam-distilled and dried.

Fluorine was then passed through the reactor at 250° C. to 300° C. to regenerate silver difluoride. The steam-distilled product from the initial fluorination of para-cymene was introduced in liquid form into the reactor at 125° C. and the temperature of the reactor was thereafter slowly increased to 190° C. and maintained at this temperature for a period of approximately 15 hours. The temperature was then increased to 250° C., and the reactor was swept with nitrogen for 1 hour. The resulting crude product was washed, dried, and frictionally distilled to obtain a fluorinated product boiling at 70° C. to 170° C., having a refractive index of 1.3123 at 28° C., and containing 69.6 per cent by weight of fluorine.

In other experiments, para-cymene was passed through the reactor in contact with silver difluoride at temperatures ranging from 200° C. to 300° C. The resultant fluorinated products had a boiling range of 70° C. to 200° C., and contained from 64.5 per cent to over 70 per cent of fluorine. In one such operation 100 milliliters of the paracymene was passed portion-wise over a period of several hours through the fluorination apparatus at a temperature of 300° C., and the crude reaction product was thereafter recycled at 300° C. Of the resultant crude reaction product, 55 milliliters had a boiling range of 120° C. to 150° C., and contained 71.2 per cent of fluorine. This product had a refractive index of 1.3120 at 28° C.

The crude products from a number of the procedures just described were combined and fractionally distilled to obtain the following fractions:

|  |  | Grams |
|---|---|---|
| A. | 80° C. to 140° C. | 19 |
| B. | 140° C. to 145° C. | 6 |
| C. | 145° C. to 147° C. | 11 |
| D. | 147° C. to 152° C. | 19 |
| E. | 152° C. to 178° C. | 107 |
| F. | Residue | 22 |

The fluorinated product was then successively recycled in contact with silver difluoride in a 12-foot by 1.25-inch tubular copper reactor at 150° C. for 10 hours, at 190° C. for 15 hours, at 300° C. for 15 hours, and 350° C. for 15 hours. The product of reaction was washed and dried after each operation and was rectified following the first and second recycling steps. These rectifications indicated the formation of steadily increasing amounts of product boiling at about 145° C. The product obtained from the final recycling operation was found to contain 45 grams of perfluoro-1-methyl-4-isopropylcyclohexane boiling at 143° C. This compound has the formula:

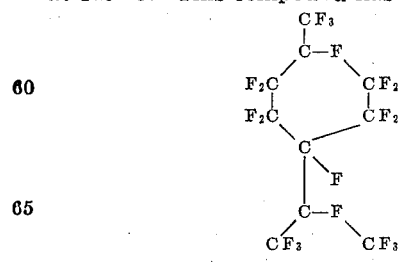

*Example 6*

Fifty milliliters of isopropylbenzene was introduced portion-wise into a silver difluoride-containing copper reactor, 12 feet by 1.25 inch, at 190° C. over a period of 2 hours. The reactor and contents were then heated to 280° C. for 1.5 hours and the system was then blown with nitrogen for 4 hours. The collected reaction product weighed 85 grams and was successively recycled through the apparatus at temperatures of 190° C., 300° C., and 360° C. The resulting mixed product was fractionally distilled to separate dodecafluorocyclohexane ($C_6F_{12}$) boiling at 50° C., and octadecafluoroisopropylcyclohexane boiling at 122° C.–124° C. A molecular weight determination gave a value of 455 as compared to a theoretical molecular weight of 450.

*Example 7*

Fifty-two grams of haloxylene product containing both chlorine and fluorine and boiling at 148° C. was passed through four 12-foot lengths of 1.25-inch copper tubing connected in series and packed with finely divided silver difluoride. These reaction units were maintained at 100° C., 150° C., 200° C., and 275° C., respectively. The apparatus was blown with nitrogen and the effluent gases were collected in the usual fashion to obtain 63 grams of mixed product. This product, when neutralized, washed, and fractionally distilled, yielded two major products. The first was identified as perfluorodimethylcyclohexane boiling at 100° C.–101° C. The second product boiled principally at 126° C. at 750 millimeters pressure and contained chlorine.

*Example 8*

Four electrically heated copper tubes, each 1.25 inches in diameter and 3 feet in length, were packed with 15 moles of silver difluoride and connected in series. Naphthalene was heated to 215° C. and nitrogen gas was slowly bubbled therethrough. The exit gases from the naphthalene vaporizer were passed into and through silver difluoride-containing copper tubing over a period of approximately 3 hours during which time 12.8 grams (0.1 mole) of naphthalene were vaporized. The temperature of the silver difluoride was maintained between 250° C. and 300° C. throughout this period. The effluent vapors from the reaction, comprising the crude fluorinated naphthalene, nitrogen, and hydrogen fluoride, were led from the reactor to a condenser consisting of a copper receptacle cooled to 0° C. Additional reaction product was recovered by passing nitrogen through the silver difluoride at a temperature of 250° C. to 300° C. for several hours. The silver salt was then regenerated to silver difluoride by passing fluorine gas through the reactor at 300° C. The crude fluorinated product obtained in the condenser was washed with water and dried, and again passed through the reactor at 300° C. This recycling procedure was repeated until a single pass of the crude product through and over the silver difluoride resulted in no further lowering of the defractive index and until the final product obtained was stable to treatment with fluorine. The final condensate was washed with water, dried, and fractionally distilled to obtain a substantially quantitative yield of perfluorodecahydronaphthalene boiling at 136° C. to 138° C., having a density of 1.915 at 27° C., and a refractive index of 1.3100 at 27° C.

In several replications of this preparation, the reaction temperature was maintained at 250° C., 275° C., and 280° C. In these preparations no decomposition or polymerization was observed, and the yields were substantially theoretical except for losses encountered during transfer of the product from the reactor and condenser. Actual yields of distilled product amounted to approximately 75 per cent of theoretical.

*Example 9*

The "flat type" reactor was arranged in series with two 8-foot lengths of 1.25-inch copper tubing partially filled with finely divided silver difluoride. One hundred milliliters of styrene was passed, over a period of 45 minutes, into the reactor system, with the flat reactor at 75° C., and the tubular reactors at 200° C. Nitrogen was employed as a diluent for the styrene during the introduction of the latter. The temperature of the reactor system was then raised to 300° C. over a period of 1.5 hours and the system thereafter flushed with nitrogen for approximately 16 hours. All of the effluent gases were passed through condensers. The liquid product of reaction weighed 115 grams; 75 per cent of this product had a boiling range of 110° C. to 135° C. and the remainder boiled below 145° C. This product was recycled at 325° C. through the flat reactor to obtain a mixed fluorinated product including 50 grams of perfluoroethylcyclohexane boiling at 99.0° to 99.8° C.

*Example 10*

The "flat type" reactor and two tubular reactors consisting of 12-foot lengths of 1.25-inch copper tubing were packed with finely divided silver difluoride, connected in series, and heated to temperatures of 125° C., 225° C., and 325° C., respectively. One hundred grams of hexafluoroxylene was passed into the system over a period of 1 hour. The apparatus was then blown for 2 hours with nitrogen and the effluent vapors were condensed. The resulting condensate was washed with dilute sodium hydroxide solution and dried to obtain 165 grams of liquid reaction material. This product was recycled through the reaction apparatus at 325° C. to obtain 160 grams of liquid material. This product was neutralized, washed, dried, and fractionally distilled in the usual manner to obtain 132 grams of perfluorodimethylcyclohexane boiling at 99.7° C. to 100.2° C. at 742 millimeters pressure. The yield of perfluorodimethylcyclohexane in this experiment was 70.8 per cent.

*Example 11*

One hundred eighty milliliters of dry acetone was passed through a 12-foot by 1.25-inch tube partially filled with silver difluoride. The temperature of the reactor was maintained at 120° C. The effluent gases from the fluorination chamber were passed through a 2-foot copper tube packed with sodium fluoride, and thereafter through two ice traps in series and into a Dry Ice-cooled condenser. A low-boiling liquid was obtained which was found to have a boiling range of −30° C. to −25° C. The boiling point of hexafluoroacetone ($CF_3COCF_3$) is −28° C.

*Example 12*

In a similar fashion, acetone was vaporized and passed, over a period of 7 hours, through the fluorinating apparatus described in Example 11, at a temperature of 270° C. The condensed effluent gases collected during the operation were fractionally distilled, whereby trifluoroacetyl fluoride was isolated as a product of the reaction. A higher-boiling fraction distilling from −30° C. to −10° C. was collected and found to be impure hexafluoroacetone.

*Example 13*

Ninety-eight milliliters of ethyl acetate was vaporized and passed, over a period of 5 hours, through a fluorination reactor consisting of a series of three 1.25-inch by 3-foot copper tubes packed with silver difluoride and maintained at 265° C. The reactor was then swept with nitrogen and the effluent gases were condensed and fractionally distilled to obtain a reaction product boiling at approximately −55° C. This product contained between 60 per cent and 65 per cent of fluorine and was principally trifluoroacetylfluoride. Carbon tetrafluoride was observed as a further product of the reaction.

*Example 14*

One hundred milliliters of acetic anhydride was vaporized and passed through the fluorination apparatus substantially as described in the preceding example. The time required for the passage of the vapor was 12 hours and the temperature of the reactor was maintained at 280° C. The effluent gases from the reactor were condensed and rectified to obtain a product identified as trifluoroacetyl fluoride.

Other organic compounds which may be reacted with silver difluoride substantially as described in the preceding examples to obtain perfluoro compounds include isobutane, isobutylene, normal butyl chloride, octane, octadecane, cyclohexane, cyclohexyl bromide, propionic acid, normal butyl ether, paraffin wax, nitro-paraffins, nitro-aromatics, polyalkyl benzenes, polyalkyl cyclohexanes, ethylene chloride, propylene chlorobromide, monofluorotetrachlorobenzene, other halogenated aliphatic compounds, heterocyclic compounds, alicyclic compounds, halogenated heterocyclic and alicyclic compounds, chloro-naphthalene and other halogenated fused ring systems, and polynuclear hydrocarbons.

We claim:

1. In the preparation of perfluoro organic compounds, the steps of reacting silver difluoride with an organic compound having at least two carbon atoms and containing at least one atom of the group consisting of hydrogen and halogen other than fluorine directly attached to carbon at a temperature above 50° centigrade until all hydrogen and non-fluorine halogen in the compound is replaced by fluorine and separating a perfluoro organic compound having at least two carbon atoms in the molecule from the reaction product.

2. The process of claim 1 wherein the organic reactant in vapor phase is contacted with the silver difluoride.

3. The process of claim 1 wherein a mixture of an inert gas and the organic reactant in vapor phase is contacted with silver difluoride as the active perfluorinating agent.

4. The process of claim 1 wherein the organic reactant in vapor phase is contacted with the silver difluoride, and the gaseous reaction product is collected outside the reaction zone.

5. The process of claim 1 wherein the reaction is carried out at progressively increasing temperatures below the temperature which causes substantial decomposition of the organic compound.

6. In the preparation of perfluoro organic compounds, the steps of reacting with silver difluoride at a temperature above 50° centigrade a partially halogenated organic compound having at least two carbon atoms until all hydrogen and non-fluorine halogen in the compound is replaced by fluorine and separating a perfluoro organic compound having at least two carbon atoms in the molecule from the reaction product.

7. In the preparation of perfluoroparaffins, the steps of exhaustively fluorinating a haloalkane having at least two carbon atoms with silver difluoride at a temperature above fifty degrees centigrade and separating a perfluoroparaffin having at least two carbon atoms in the molecule from the reaction product.

8. In the preparation of perfluoro compounds, the steps of exhaustively fluorinating with silver difluoride a compound comprising a cyclohexyl ring structure at a temperature above fifty degrees centigrade and separating a perfluoro compound having at least two carbon atoms in the molecule from the reaction product.

9. In the preparation of perfluoro compounds comprising a cyclohexyl ring structure, the steps of exhaustively fluorinating haloaromatic hydrocarbon with silver difluoride at a temperature above fifty degrees centigrade and separating a perfluoro compound comprising a cyclohexyl ring structure from the reaction product.

10. In the preparation of perfluoro compounds comprising a cycloalkyl ring structure, the steps of exhaustively fluorinating a partially fluorinated aromatic compound with silver difluoride at a temperature above fifty degrees centigrade and separating a perfluoro compound comprising a cycloalkyl ring structure from the reaction product.

11. In the preparation of a fluorocarbon, the steps of reacting silver difluoride with an organic compound having at least two carbon atoms in the molecule and containing at least one atom of the group consisting of hydrogen and halogen other than fluorine directly attached to carbon at a temperature above fifty degrees centigrade until all hydrogen and non-fluorine halogen in the compound is replaced by fluorine and separating a perfluoro organic compound having the same number of carbon atoms in the molecule as the starting material from the reaction product.

12. In the preparation of perfluoro organic compounds, the step of reacting silver difluoride with a hydrocarbon having at least two carbon atoms at a temperature above 150 degrees centigrade until all the hydrogen of said hydrocarbon has been replaced by fluorine.

13. In the preparation of perfluoro organic compounds, the step of reacting silver difluoride with a hydrocarbon vapor having at least two carbon atoms at a temperature between 150° C. and 400° C. until all the hydrogen of said hydrocarbon has been replaced by fluorine.

EARL T. McBEE.
RICHARD M. ROBB.
WALDO B. LIGETT.

REFERENCES CITED

The following references are of record in the file of this patent:

UNITED STATES PATENTS

| Number | Name | Date |
|---|---|---|
| 2,090,772 | Wiezevich | Aug. 24, 1937 |
| 2,129,289 | Soll | Sept. 6, 1938 |
| 2,186,916 | Wiezevich | Jan. 9, 1940 |
| 2,307,773 | Egloff | Jan. 12, 1943 |

FOREIGN PATENTS

| Number | Country | Date |
|---|---|---|
| 214,293 | Great Britain | Apr. 14, 1924 |

OTHER REFERENCES

Ruff et al., Z. fur Anor. and Allg. Chemie, vol. 219, pp. 143–8 (1934).

Ruff et al., Angewandte Chemie, vol. 47, p. 480 (1934).

Jockusch, Naturwissenschaften, vol. 22, p. 561 (1934).